United States Patent
Michel et al.

(10) Patent No.: US 8,783,134 B2
(45) Date of Patent: Jul. 22, 2014

(54) GEARING

(75) Inventors: Frank Michel, Weikersheim (DE);
Michael Schmidt, Giebelstadt (DE);
Thomas Bayer, Igersheim (DE); Heiko Schreiber, Weikersheim (DE); Lars Estermann, Weikersheim (DE)

(73) Assignee: Wittenstein AG, Igersheim (DE)

( * ) Notice: Subject to any disclaimer, the term of this patent is extended or adjusted under 35 U.S.C. 154(b) by 496 days.

(21) Appl. No.: 13/073,572

(22) Filed: Mar. 28, 2011

(65) Prior Publication Data

US 2011/0259144 A1    Oct. 27, 2011

(30) Foreign Application Priority Data

Apr. 22, 2010 (DE) .......................... 10 2010 016 581

(51) Int. Cl.
*F16H 35/00* (2006.01)

(52) U.S. Cl.
USPC .......................................................... 74/640

(58) Field of Classification Search
USPC ........... 74/640, 409, 411, 410, 434, 444, 437, 74/438
See application file for complete search history.

(56) References Cited

U.S. PATENT DOCUMENTS

| | | | | |
|---|---|---|---|---|
| 2,966,808 A * | 1/1961 | Grudin | ............................ | 74/640 |
| 3,006,215 A * | 10/1961 | Walton | ........................ | 74/665 E |
| 3,090,258 A * | 5/1963 | Zink et al. | ...................... | 475/338 |
| 3,161,080 A * | 12/1964 | Schaefer, Jr. | .................... | 74/640 |
| 3,214,999 A * | 11/1965 | Lapp | ............................ | 74/665 D |
| 3,435,705 A * | 4/1969 | Musser | ............................ | 74/640 |
| 3,444,760 A * | 5/1969 | Esmay et al. | ................... | 74/640 |
| 3,451,495 A * | 6/1969 | Bayless et al. | ............... | 180/19.1 |
| 3,473,416 A * | 10/1969 | Pope et al. | ....................... | 475/92 |
| 3,496,782 A * | 2/1970 | Carlson et al. | ................. | 74/10.8 |
| 3,668,946 A * | 6/1972 | Fahey et al. | ..................... | 74/640 |
| 3,996,816 A * | 12/1976 | Brighton | ......................... | 74/640 |
| 4,003,272 A * | 1/1977 | Volkov et al. | ................... | 74/640 |
| 4,099,427 A * | 7/1978 | Fickelscher | ................... | 475/176 |
| 4,798,104 A | 1/1989 | Chen et al. | | |
| 7,966,907 B2 * | 6/2011 | Koyama | ......................... | 74/640 |
| 2004/0097319 A1* | 5/2004 | Tsurumi | ....................... | 475/165 |
| 2004/0198543 A1* | 10/2004 | Christ | ........................... | 475/163 |
| 2009/0205451 A1 | 8/2009 | Bayer et al. | | |
| 2010/0024593 A1 | 2/2010 | Schmidt et al. | | |

FOREIGN PATENT DOCUMENTS

| | | |
|---|---|---|
| DE | 341053 | 9/1921 |
| DE | 2310751 | 9/1973 |
| DE | 3906053 | 8/1990 |
| DE | 102006042786 | 9/2008 |
| DE | 102007016189 | 10/2008 |
| DE | 102007019607 | 10/2008 |
| WO | 99/36711 | 7/1999 |

* cited by examiner

*Primary Examiner* — Troy Chambers
*Assistant Examiner* — Valentin Craciun
(74) *Attorney, Agent, or Firm* — Bachman & LaPointe, P.C.

(57) ABSTRACT

Gearing (1), in particular single-stage gearing having a transmission ratio of greater than 1 to 10, having an internal gear (2) with an internal toothing (5), a first toothed ring with radially movable first teeth (6) for engaging into the internal toothing (5), a second toothed ring with radially movable second teeth (7) for engaging into the internal toothing (5), an inner shaft (21) on which is fastened a first cam disk (16) for the radial drive of the first teeth (6) and a second cam disk (17) for the radial drive of the second teeth (7), and a load dividing device for dividing a torque transmitted via the toothed rings between the toothed rings.

11 Claims, 4 Drawing Sheets

GEARING

BACKGROUND OF THE INVENTION

The invention relates to a gearing and, more particularly, a single stage gearing.

The prior art has disclosed gearings which, by means of a selective engagement of teeth of a toothed ring into an internal toothing, can attain high transmission ratios of for example 1 to 50 or 1 to 100 in a single stage. An example of such a gearing is that disclosed in DE 10 2006 042 786 B4. Furthermore, under the name "harmonic drive", gearings have become known which are of similar design to the gearing disclosed in DE 10 2006 042 786 B4, but the harmonic drive gearings have flexible toothed rings and not individual teeth which can move separately from one another.

Gearings having individual teeth which can move independently of one another have the advantage that high torques can be transmitted because the teeth need not be produced from a flexible material, as is the case in harmonic drive gearings. However, a transmission of torque by means of individual stable teeth has limits, in particular on account of the fact that there is always only in each case a very limited number of teeth in active engagement, for the purpose of transmitting torque, with an internal toothing of an internal gear.

One option for increasing the transmissible torques is to increase the diameter of the internal gear and therefore of the gearing. A further option is to increase the width of the teeth, that is to say the extent of the teeth in the axial direction of the internal gear or of the gearing. An increase in diameter is not expedient for all gearings on account of the installation possibilities. Likewise, a widening of the teeth is possible only to a limited extent.

Within the context of the invention, embodiments are preferable in which a plurality of toothed rings are provided. Here, however, the problem can again arise that, on account of torsion of parts of the gearing, the individual toothed rings are subjected to different loadings, such that the limit load of the gearing, that is to say the greatest torque that can be transferred, is determined by the then most heavily loaded toothed ring. This is ineffective.

It is an object of the invention to specify a gearing by means of which the disadvantages of the prior art are eliminated or at least alleviated. In particular, it is an object of the invention to specify a gearing which has a high transmission ratio and which, while having a small diameter, can transmit high torques.

SUMMARY OF THE INVENTION

The object is achieved by providing a gearing according to the invention having a coaxial design of an internal gear and an inner shaft, wherein at least two, preferably at least three or at least five cam disks are arranged on the inner shaft. This wording also encompasses an embodiment in which the inner shaft is formed in one piece with the cam disks. On the cam disks there is preferably arranged a bearing means which is suitable for reducing friction between the teeth and the cam disk. For example, a multiplicity of rollers may be arranged on the cam disk, which rollers in turn bear a flexible ring. The teeth are arranged in the radial direction toward the outside on said flexible ring. The teeth are preferably mounted so as to be radially movable in sub-groups, particularly preferably individually, wherein the teeth are preferably of rigid design.

The invention expressly encompasses gearings which have more than two, preferably more than three or even more preferably at least five toothed rings and cam disks.

Typical embodiments are designed as single-stage gearing. In such a case, single-stage preferably means that exactly one stage with a plurality of cam disks can be present on exactly one inner shaft. To this one stage with cam disks, advantageously, further gearings such as for example a planetary gearing may be connected in the same housing or with further housings. Typical embodiments have within a housing only one inner shaft onto which cam disks are arranged. For single-stage gearings under specification, whereby the gearing is preferably dimensioned for high torques with smallest diameter, the problem of load distribution arises in a particular way due to torsional deformation of components of the gearing during load. The load dividing means is preferably able to oppose an uneven load distribution that is caused by a torsional deformation under load.

Typical embodiments are designed such that at least two cam disks are integrally formed. The integrally formed cam disks can be in identical or different angular positions. An integrally formed cam disk, which acts upon a plurality of tooth rings has the advantage of a simple configuration.

The teeth of the toothed rings are preferably coupled by means of a tooth carrier. It is particularly preferable for the teeth at least of some of the toothed rings to be coupled by means of precisely one tooth carrier. This offers the advantage that torques transmitted via the toothed rings are conducted into a single tooth carrier. In this way, it is possible for a large torque to be transmitted by means of the multiplicity of toothed rings.

The inner shaft may be in one piece or in a plurality of pieces, wherein in the case of a multi-piece inner shaft, joints are preferably arranged between the individual shaft segments in order to permit a greater curvature or bending of the inner shaft. The internal gear is preferably in one piece or preferably in a plurality of pieces, wherein in the case of a multi-piece design of the internal gear, the plurality of pieces of the internal gear are preferably coupled or connected. In this application, "coupled" means preferably that the corresponding pieces are coupled in terms of a rotation about the axis of the gearing, that is to say the axis of rotational symmetry of the internal gear or the axis of rotational symmetry of the inner shaft, in order to transmit torques about said axis.

Preferred embodiments of the invention comprise a load dividing means for dividing a torque transmitted via the toothed rings between the toothed rings. The load dividing means is suitable for dividing a torque transmitted through the gearing between the toothed rings. It is particularly preferable if the load dividing means is suitable for dividing the torque between the toothed rings in such a way that, at a certain operating point, all the toothed rings are substantially equally loaded. For this purpose, the internal gear, the toothed rings, the cam disks or the inner shaft are designed such that, at a certain operating point, the torque transmitted through the gearing is distributed substantially uniformly between the toothed rings. The operating point is preferably a maximum torque to be permanently transmitted through the gearing or a torque of at least 50% or at least 70% of the maximum transmitted torque. This offers the advantage that the gearing can be optimally utilized. In this way, gearings of elongate design which are suitable for special installation situations may be formed which, furthermore, with a high transmission ratio, can transmit high torques. In typical embodiments, the load dividing means is intended to oppose the uneven load distribution on the toothed rings caused by the deformation of the gearing under load. Deformation of the gearing affects in particular a torsion of the inner shaft, a torsion of the tooth carriers or of the internal gear. Preferred embodiments show load dividing means that during torsional deformation of the inner shaft, the tooth carriers or the internal gear under load, achieve an equalization of load distribution on the toothed rings.

The length of the gearing in the axial direction of the inner shaft is preferably greater than the outer diameter of the internal gear. Such a gearing is particularly suitable for restricted installation situations. Gearings are particularly preferable in which the length of the gearing is twice as long as the outer diameter of the internal gear. Here, the length of the gearing preferably denotes the length between the outer flanks of the outer toothed rings. Preferred gearings have at least two toothed rings, wherein particularly preferred gearings comprise at least three or at least four toothed rings.

It is preferable for either the tooth carrier to be coupled to a static counterbearing and for the internal gear to be coupled to a drive output shaft or for the tooth carrier to be coupled to a drive output shaft and the internal gear to be coupled to a static counterbearing. High transmission ratios can be attained in this way.

The load dividing means preferably comprises a coupling of the drive output shaft to a first end of the gearing and a coupling of the counterbearing to a second end, which is opposite the first end, of the gearing. By means of the opposite coupling of the drive output shaft at one side and of the counterbearing at the other side, it is achieved that the two torsion angles of the tooth carrier and of the internal gear, which are coupled to the drive output shaft or to the counterbearing, at least partially cancel one another out.

The tooth carrier and the internal gear advantageously have torsional rigidities which differ by less than a factor of 4. Particularly preferable is a difference by a factor of less than 2, and even more preferably of less than 1.5. It is particularly preferable for the difference between the torsional rigidities of the internal gear on the one hand and of the inner shaft or of the tooth carrier on the other hand to be less than 4, 2, 1.5 or most preferably 1.2. The internal gear and tooth carrier preferably have a similar rigidity, because it is here in each case that the load acts. The inner shaft preferably has a rigidity coordinated with the respective transmission ratio. It should be noted that the inner shaft on the drive input side need transmit a significantly lower torque, such that the torsional rigidity of the inner shaft may be lower than that of the internal gear or of the tooth carrier.

It is achieved in this way that an angular deflection under load is at least substantially similar, such that a division of the transmitted torque between the toothed rings is as uniform as possible. Furthermore, said embodiment has the particular advantage that the division functions independently of the absolute magnitude of the torque even at for example 20% of the maximum transmissible torque, and is independent of the load direction.

The first cam disk and the second cam disk advantageously each have at least one radius maximum, the load dividing means comprising a twist angle of the radius maxima of the cam disks about the longitudinal axis of the inner shaft. The radius of the radius maximum relates, in this application, to an axis of rotation of the cam disks. In the case of more than two cam disks, two in each case adjacent cam disks are preferably twisted relative to one another, that is to say their respective radius maxima are twisted relative to one another. Where a twist angle is mentioned, this means a twist angle not equal to 0°. The twist angle is preferably selected such that, for a predetermined load point and load direction, an at least substantially uniform load division between the toothed rings is obtained. The load point is preferably a maximum load of the gearing. Different twist angles are obtained depending on the design of the gearing.

The twist angle of two adjacent cam disks is preferably such that, in the unloaded state of the gearing, at least one of the toothed rings is eccentrically in engagement with the internal toothing. Here, the cam disks are preferably twisted relative to one another by a maximum of 1°. An angular deflection of the components along the gearing under load is allowed for in this way. A uniform load division along the longitudinal axis of the gearing is obtained in this way.

In typical embodiments, at least one of the cam disks is arranged such that, when the gearing is in an idle state, that is to say without load, the teeth of the toothed ring of said cam disk engage in an offset manner, or eccentrically, into the internal toothing. Here, offset means that the tooth which is situated over the radius maximum of the cam disk is not centered in relation to the corresponding tooth space of the internal toothing. This may be achieved by means of the above-described angular deflection of the cam disks relative to one another with continuous internal toothing. A further possibility is for a larger twist angle, which corresponds to a multiple of the tooth angle, to be superposed on the angular deflection in order to obtain the offset of the toothing.

The twist angle of in each case two adjacent cam disks is at least substantially 45°, 60°, 90°, 120° or 180°. Here, "substantially" means that the above-described offset of the toothing may additionally be provided. It is particularly preferable for a plurality of cam disks to be arranged one behind the other in each case alternately. Here, alternately means that for example elliptical cam disks are twisted relative to one another in each case of 90°. In the case of cam disks having only one cam, a twist angle by 120° relative to one another or 180° relative to one another is preferable, wherein other embodiments are possible. This offers the advantage of a uniform division of the load over the length and the circumference of the inner shaft and of the internal gear.

The load dividing means preferably provides different degrees of play of the first teeth and of the second teeth. In particular in the case of more than two toothed rings, the degree of play corresponds at least substantially to a load-dependent profile under loading of the gearing. The profile is preferably curved, particularly preferably parabolic, with a minimum of the degree of play in the center of the longitudinal axis of the gearing. The greater degree of play has the effect that the corresponding toothed ring is subjected to lower loading. During operation of a gearing according to the invention, lower loadings of the toothed rings occur at the edges than in the middle. To obtain a uniform division between all the tooth rows over the longitudinal axis of the gearing, the load dividing means therefore makes provision to vary the degree of play of the tooth rows according to the loading, whereby the teeth and the ends of the gearing are provided with a greater preset degree of play than the teeth in the middle. The degree of play of the tooth rows therefore corresponds to a preferably parabolic/curved profile.

A preferred option for the provision of a greater degree of play is for the first cam disk to have a smaller radius than the second cam disk. A second preferred option is for the first teeth to have a shorter tooth length. Furthermore, as an option for obtaining different degrees of play, it is preferable for an elastic bearing outer ring to be formed with a smaller thickness. Ring segments which are arranged between the cam disks or rolling bearings and the teeth are expediently formed with different thicknesses in order to obtain different degrees of play. It is generally preferable, in the case of more than two toothed rings arranged one behind the other in a row, for the respective degrees of play of the toothed rings to assume a parabolic profile. This permits uniform loading at a certain operating point. Said embodiments offer the advantage of enabling a division between the toothed rings independently of the load direction, that is to say the direction of rotation.

To permit bending of the relatively long gearing during operation, in a preferred embodiment, the inner shaft or the internal gear are designed such that they can bend in a radius of less than 100 meters during operation, even more preferably of a maximum of 50 meters and more preferably of a maximum of 30 meters. In the case of a static internal gear, the internal gear may be formed with a fixed curve, or positively locking connections with corresponding degrees of play may be provided. Axial bending of the gearing without the use of joints and with load division between the toothed rings is possible by means of the variation of the degrees of play of the toothed rings.

BRIEF DESCRIPTION OF THE DRAWINGS

Further advantages and features of preferred embodiments of the invention will be explained below on the basis of the appended drawings, wherein in the figures:

FIG. 3b shows a perspective schematic sketch of the load distribution on the internal gear with an arrangement of the cam disks according to FIG. 3a;

FIG. 4b shows a schematic perspective view of the load distribution on the internal gear in the case of an arrangement of the cam disks according to FIG. 4a.

DETAILED DESCRIPTION

Figure 1:
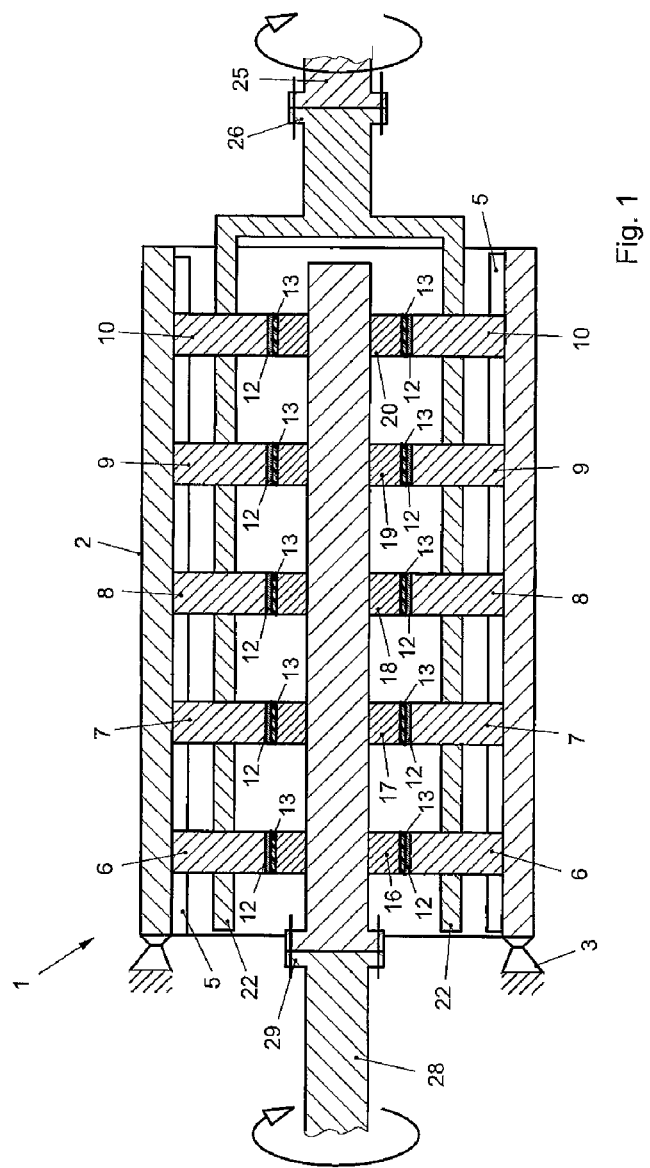
FIG. 1 shows a schematic sectional view of an embodiment of a gearing according to the invention.

FIG. 1 shows a schematic sectional view of a preferred embodiment of a gearing according to the invention. In the description of FIGS. 1 to 5, the same reference numerals are used for identical or similar parts, and in some cases are not explained in their entirety again in the individual Figures and descriptions.

FIG. 1 shows a gearing 1 according to the invention, the gearing comprising an externally situated internal gear 2 which is fixed by means of a static counterbearing 3. The counterbearing 3 engages on the circumference of the internal gear 2 at a plurality of points at one end of the gearing.

The internal gear 2 has an internal toothing 5 into which first teeth 6 of a first toothed ring and second teeth 7 of a second toothed ring engage. Furthermore, teeth 8 to 10 of further toothed rings engage into the internal toothing 5. The teeth 6 to 10 are mounted radially at the inside in each case on a flexible ring 12, which flexible rings are mounted via rollers 13 in each case on cam disks 16 to 20. In the following description, reference will be made in particular to the first cam disk 16 and the second cam disk 17. All the cam disks 16 to 20 are arranged on an inner shaft 21 for conjoint rotation therewith.

The cam disks 16 to 20 have a radius which varies in the circumferential direction, such that during a rotation of the inner shaft 21, the teeth 6 to 10 are in each case driven outward into the internal toothing 5 of the internal gear 2 in certain positions of the inner shaft 21. By means of a different spacing of the teeth 6 to 10 and of the internal toothing 5, it is achieved that for example 50 teeth of the toothed ring and 51 tooth spaces of the internal toothing 5 are arranged over the entire circumference. For the further description and explanation of said type of gearings, reference is made to DE 10 2006 042 786 B4.

In the gearing 1 of FIG. 1, the individual toothed rings with the teeth 6 to 10 and the internal toothing 5 are of identical design at all points of the individual toothed rings. In this way, a torque is transmitted from the inner shaft 21 to the teeth 6 to 10 via the toothed rings with the teeth 6 to 10 in parallel, with a high transmission ratio being attained.

The teeth 6 to 10 of the five toothed rings are arranged in a common tooth carrier 22 in which the teeth 6 to 10 are in each case mounted such that they can move in the radial direction.

The gearing 1 of FIG. 1 is driven, at the left-hand end, by a drive input shaft 28. The drive input shaft 28 is connected or coupled to the inner shaft 21 for conjoint rotation therewith by means of a drive input flange 29. At the other, right-hand end of the gearing 1, the tooth carrier 22 is connected or coupled to a drive output shaft 25 for conjoint rotation therewith by means of a drive output flange 26. A counterbearing 3 fixes the internal gear at the left-hand end of the gearing.

The illustrated constellation, with in each case 24 teeth 6 to 10 which interact by means of identically designed cam disks 16 to 20 arranged with identical angular position on the inner shaft 21, has the effect that in each case approximately the same torque is transmitted via the individual teeth 6 to 10. The reason is that a deformation of the tooth carrier 22, which has substantially the same torsional rigidity as the internal gear 22, results in approximately equal torsion of said two parts, such that the load is divided uniformly.

Figure 2A:
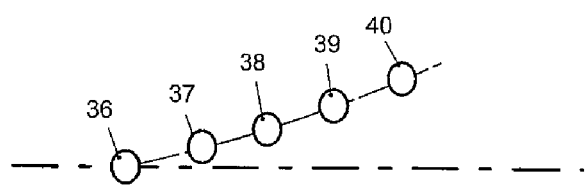
FIG. 2a schematically shows an offset according to the invention between toothed rings on an inner shaft.
Figure 2B:
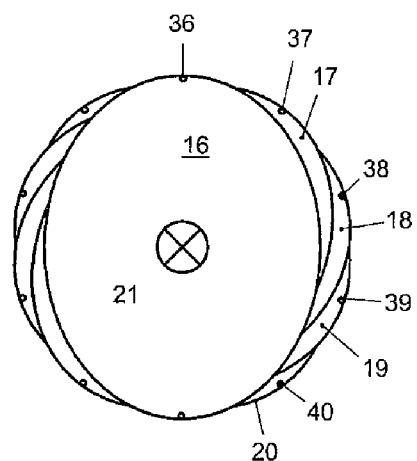
FIG. 2b shows an arrangement according to the invention of different cam disks relative to one another.

FIGS. 2a and 2b schematically show a further compensating means of gearings according to the invention. The exemplary embodiment of FIGS. 2a and 2b is not shown in its entirety again, wherein reference is therefore made to the description of the figure and FIG. 1. In contrast to the exemplary embodiment of FIG. 1, an angular offset of the individual cam disks relative to one another is provided in the exemplary embodiment of FIGS. 2a and 2b. Here, a following cam disk is in each case twisted by an angle relative to the preceding cam disk. The internal gear may be fixed with respect to the drive output, or completely fixed, as in FIG. 1. FIG. 2a shows how the respective radius maximum of the cam disks is shifted by an angle. The angle is smaller than the angular spacing of two tooth spaces. Upon an engagement into a hollow shaft with a continuous, uniform internal toothing, it is achieved in this way that, at a load point for which the respective angular deflection is calculated, all the toothed rings transmit approximately the same torque. The torsion of the tooth cage and of the internal gear compensates the angular offset.

It should be noted that, without load, or at very low load, the teeth of at least some of the toothed rings engage "obliquely" into the tooth spaces, since the compensation as a result of torsion under load is eliminated. Here, "obliquely" means that the central axis of the tooth does not correspond to the central axis of the tooth space. Here, however, in the unloaded state, at least the teeth of one of the toothed rings engages into the internal toothing eccentrically, that is to say shifted by an angle of less than the angular spacing of the tooth spaces.

As a result of a shift of the maximum points, it is now achieved that, at a calculated load point, preferably the permanent maximum load of the gearing, the load is divided approximately equally. FIG. 2a now schematically shows the relative position of the radius maxima 36 to 40 relative to the angular position of the radius maximum 36 of the cam disk 16. The radius maxima 37 to 40 belong in each case to the cam disks 17 to 20. In FIG. 2, the position of the radius maxima 36 to 40 of the cam disks 16 to 20 is illustrated on a greatly exaggerated scale schematically in a plan view in the axial direction.

A further possibility is an offset of the internal toothing of the respective toothed rings in the internal gear. This, too, can be used as a load dividing means in order to divide the load between the toothed rings at a certain loading of the gearing.

FIGS. 3 and 4 show different constellations of a further load dividing means for a gearing according to the invention. Here, reference is again made to the figure description of FIG. 1, wherein primarily the differences in relation to the exemplary embodiment of FIG. 1 will be presented below.

FIGS. 3 and 4 show how, by means of an angular distribution of the radius maxima of the cam disks on the inner shaft, it is possible to keep a total deformation of the internal gear or of the inner shaft as low as possible and, in this way, to use small wall thicknesses. This, too, assists in providing a gearing which, with minimum deformation of the components involved, is simultaneously as slim as possible. Here, slim means that the gearing has as small a diameter as possible while being able to transmit a high maximum torque. Said gearings are particularly suitable for special installation situations in which a small diameter is important.

Figure 3A:
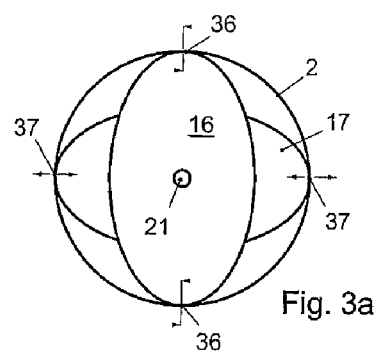
FIG. 3a schematically shows a view of a further option according to the invention for the arrangement of cam disks.
Figure 3B:
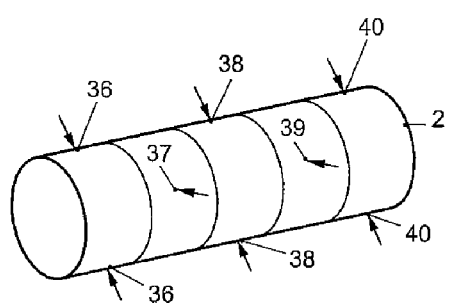

In the example shown in FIGS. 3a and 3b, two adjacent cam disks 16 and 17 are in each case twisted by 90°. In this way, the respective radius maxima are likewise twisted by 90°. In FIG. 3b, the regions are indicated in which the tooth engagement regions or radius maxima 36 to 40 are to be found on the internal gear 2 in each case. It should be taken into consideration that, in the exemplary embodiment of FIG. 3, the cam disks 16 to 20 have in each case two opposite radius maxima, that is to say they are of elliptical design. As a result of the arrangement, a uniform loading of the internal gear 2 and therefore as low a deformation of the internal gear 2 as possible is obtained. It should be noted that the possibilities shown in FIGS. 3 and 4 for dividing a load as uniformly as possible between the internal gear and the inner shaft may be combined in any desired manner with other load dividing means. Likewise, the other load dividing means may in each case also be combined with one another, wherein however it should be noted that a complete load division could already be obtained for example exclusively with the load dividing means explained in conjunction with FIG. 1. Here, however, even with a complete load division between the toothed rings, it is advantageous for the load to be distributed to the internal gear as shown in FIGS. 3 and 4, because in this way, it is possible to achieve an additional advantage through the possibility of using smaller wall thicknesses.

Figure 4A:
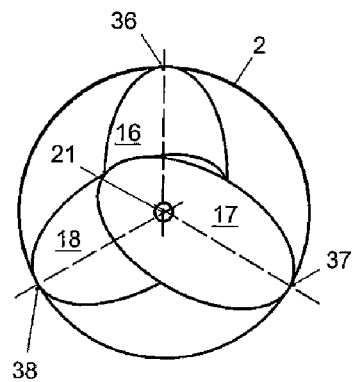
FIG. 4a schematically shows a further arrangement according to the invention of cam disks.
Figure 4B:
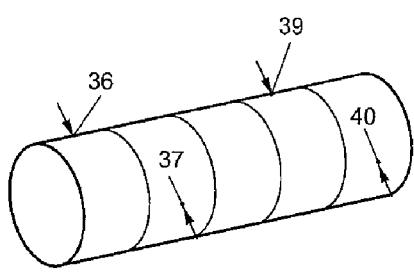

FIGS. 4a and 4b show a similar possibility for load division to that in FIGS. 3a and 3b, wherein the cam disks 16 to 20 in the exemplary embodiment of FIGS. 4a and 4b have in each case only one cam or only one radius maximum 36 to 40. The cam disks 16 to 20 are arranged one behind the other, twisted relative to one another by an angle of 120°. In the perspective view of FIG. 4b, the radius maximum 38 is not shown because it lies on the rear side in this illustration. The plan view in the axial direction in FIG. 4a shows the cam disks 16 to 18, the cam disk 19 being arranged in turn in line with the cam disk 16, and the cam disk 20 being arranged in turn in line with the cam disk 17.

Figure 5:
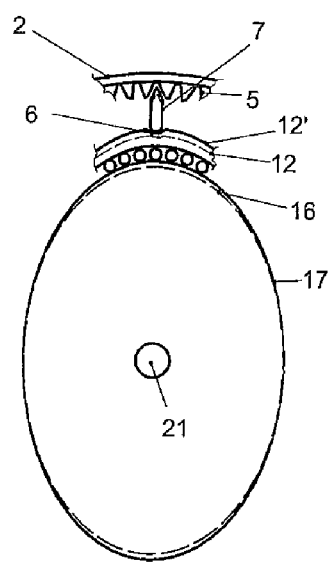
FIG. 5 shows a schematic sectional view of the difference according to the invention between two cam disks, two types of teeth or two types of pivoting segments.

FIG. 5 shows a further possibility for load division, wherein in FIG. 5 in each case two cam disks, two teeth and two ring segments are shown. To obtain different degrees of play at the different toothed rings, it is however sufficient for only one of said parts to be designed differently. It is self-evidently also possible for a plurality of said elements to simultaneously be designed differently.

The first cam disk 16 is illustrated by dashed lines and has smaller radius maxima than the second cam disk 17, which is illustrated by a solid line. As a result of the smaller radii of the first cam disk 16, the first teeth 6 driven by the first cam disk 16 are not driven as far into the internal toothing 5 as the second teeth 7 driven by the second cam disk 17. In this way, it is achieved that the first teeth 6 have a greater degree of play also in the circumferential direction upon engagement into the internal toothing 5. In this way, when the gearing is subjected to only a low torque loading, only the toothed ring with the second teeth 7 comes into engagement. Here, it should be noted that the exemplary embodiments of FIG. 5 are described only for two toothed rings, wherein in this regard reference is made analogously to FIG. 1. The effect of the play is substantially the same as that of the offsetting of the tooth rows for eccentric engagement, but with the advantage that the effect is equally pronounced for both load directions of torque transmission. Likewise, a parabolic angular offset of the cam disks is also suitable for being used as a load compensating means.

It is self-evidently possible for the exemplary embodiments of FIG. 5 to also be formed with for example five toothed rings or some other number of toothed rings in order to transmit even higher torques. Here, the play of the teeth increases preferably from the middle of the gearing in the axial direction to the ends of the gearing. In this way, as uniform a loading of the individual toothed rings as possible is obtained at a certain load point of the gearing.

A further possibility for obtaining different degrees of play is, as illustrated, for the first teeth 6 to be formed to be shorter than the second teeth 7. In this way, too, it is achieved that the play of the first toothed ring is greater than the play of the second toothed ring.

A further advantageous possibility is for the ring segments 12 and 12' to be designed differently. In contrast to the exemplary embodiment of FIG. 1, the ring segments 12 and 12' are not of identical design but rather have different heights. The ring segment 12 of the first toothed ring which lifts one of the first teeth 6 is thus formed to be thinner than the ring segment 12' of the second toothed ring which lifts one of the second teeth 7. In this way, a greater degree of play of the first toothed ring with the first teeth 6 is obtained, such that, at low loading, the load is transmitted primarily by the second teeth 7, whereas at relatively high load, on account of torsion of the inner shaft 21 and of the internal gear 2, the first teeth 6 are also subjected to loading, since the second toothed ring is "sufficient" as a result of the torsional action.

The invention claimed is:

1. Gearing, in particular single-stage gearing having a transmission ratio of greater than 1 to 10, comprising
(a) an internal gear with an internal toothing,
(b) a first toothed ring with radially movable first teeth for engaging into the internal toothing,
(c) a second toothed ring with radially movable second teeth for engaging into the internal toothing,
(d) an inner shaft on which is fastened a first cam disk for the radial drive of the first teeth and a second cam disk for the radial drive of the second teeth,
(e) wherein the first teeth and the second teeth provide different degrees of play for dividing a torque transmitted via the toothed rings between the toothed rings, and (f) wherein for different degrees of play of the first teeth and the second teeth, the cam disks have a different radius maxima, the first teeth and the second teeth have different lengths, and/or ring segments of the first toothed ring and of the second toothed ring have different radial thicknesses.

2. Gearing according to claim 1, wherein at least one further toothed ring with further teeth and with at least one further cam disk, arranged on the inner shaft, for driving the further teeth.

3. Gearing according to claim 1, wherein the teeth of the toothed rings are coupled by means of a tooth carrier.

4. Gearing according to claim 1, wherein the length of the gearing in the axial direction of the inner shaft is greater than the outer diameter of the internal gear.

5. Gearing according to claim 1, wherein the tooth carrier is coupled to a drive output shaft and the internal gear is coupled to a static counterbearing.

6. Gearing according to claim 1, wherein the drive output shaft is coupled to a first end of the gearing and the counterbearing is coupled to a second end, which is opposite the first end, of the gearing.

7. Gearing according to claim 1, wherein the tooth carrier and the internal gear have torsional rigidities which differ by less than a factor of four.

8. Gearing according to claim 1, wherein the first cam disk (16) and the second cam disk each have at least one radius maximum in relation to an axis of rotation of the cam disks, the load dividing means comprising a twist angle of the radius maxima of the cam disks about the longitudinal axis of the inner shaft.

9. Gearing according to claim 8, wherein in the twist angle of two adjacent cam disks is such that, in the unloaded state of the gearing, at least one of the toothed rings is eccentrically in engagement with the internal toothing.

10. Gearing according to claim 8, wherein the twist angle of in each case two adjacent cam disks is at least substantially 45°, 60°, 90°, 120° or 180°.

11. Gearing according to claim 9, wherein the twist angle of in each case two adjacent cam disks is at least substantially 45°, 60°, 90°, 120° or 180°.

* * * * *